United States Patent
Luo et al.

(10) Patent No.: US 9,679,192 B2
(45) Date of Patent: Jun. 13, 2017

(54) 3-DIMENSIONAL PORTRAIT RECONSTRUCTION FROM A SINGLE PHOTO

(71) Applicant: Adobe Systems Incorporated, San Jose, CA (US)

(72) Inventors: Linjie Luo, San Jose, CA (US); Sunil Hadap, Dublin, CA (US); Nathan Carr, San Jose, CA (US); Kalyan Sunkavalli, San Jose, CA (US); Menglei Chai, Zhejiang (CN)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 14/695,727

(22) Filed: Apr. 24, 2015

(65) Prior Publication Data

US 2016/0314619 A1    Oct. 27, 2016

(51) Int. Cl.
| | | |
|---|---|---|
| *G06T 7/20* | (2006.01) | |
| *G06K 9/00* | (2006.01) | |
| *G06T 7/33* | (2017.01) | |
| *G06T 7/507* | (2017.01) | |
| *G06T 11/00* | (2006.01) | |
| *G06T 17/00* | (2006.01) | |

(52) U.S. Cl.
CPC .......... *G06K 9/00221* (2013.01); *G06T 7/344* (2017.01); *G06T 7/507* (2017.01); *G06T 11/00* (2013.01); *G06T 17/00* (2013.01); *G06T 2207/30201* (2013.01)

(58) Field of Classification Search
USPC ................................................ 345/419, 426
See application file for complete search history.

(56) References Cited

U.S. PATENT DOCUMENTS

| | | | | |
|---|---|---|---|---|
| 7,319,467 | B2 * | 1/2008 | Weyrich | .................. G06T 15/50 |
| | | | | 345/426 |
| 8,009,880 | B2 * | 8/2011 | Zhang | ................ G06K 9/00268 |
| | | | | 345/582 |
| 8,300,234 | B2 * | 10/2012 | Debevec | ................ G01N 21/55 |
| | | | | 356/600 |

(Continued)

OTHER PUBLICATIONS

Chai et al. "Single-View Hair Modeling for Portrait Manipulation"; published 2012.*

*Primary Examiner* — Kimbinh T Nguyen
(74) *Attorney, Agent, or Firm* — Kilpatrick Townsend & Stockton LLP

(57) ABSTRACT

Systems and methods are disclosed herein for 3-Dimensional portrait reconstruction from a single photo. A face portion of a person depicted in a portrait photo is detected and a 3-Dimensional model of the person depicted in the portrait photo constructed. In one embodiment, constructing the 3-Dimensional model involves fitting hair portions of the portrait photo to one or more helices. In another embodiment, constructing the 3-Dimensional model involves applying positional and normal boundary conditions determined based on one or more relationships between face portion shape and hair portion shape. In yet another embodiment, constructing the 3-Dimensional model involves using shape from shading to capture fine-scale details in a form of surface normals, the shape from shading based on an adaptive albedo model and/or a lighting condition estimated based on shape fitting the face portion.

19 Claims, 6 Drawing Sheets

(56) References Cited

U.S. PATENT DOCUMENTS

| | | | | |
|---|---|---|---|---|
| 9,058,765 B1* | 6/2015 | Mallick | ............... | G06F 3/0482 |
| 9,117,279 B2* | 8/2015 | Zhang | ............... | G06T 7/0067 |
| 9,367,940 B2* | 6/2016 | Weng | ............... | G06K 9/00281 |
| 2007/0031028 A1* | 2/2007 | Vetter | ............... | G06K 9/00208 |
| | | | | 382/154 |
| 2011/0234581 A1* | 9/2011 | Eikelis | ............... | G06K 9/00228 |
| | | | | 345/419 |
| 2015/0054825 A1* | 2/2015 | Weng | ............... | G06T 7/0079 |
| | | | | 345/420 |

* cited by examiner

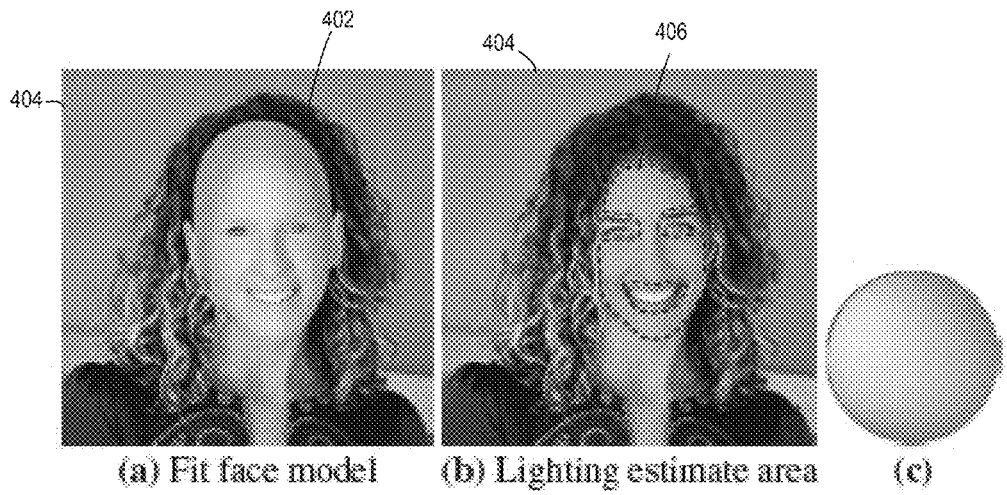
(a) Fit face model
FIG. 4A
(b) Lighting estimate area
FIG. 4B
(c)
FIG. 4C
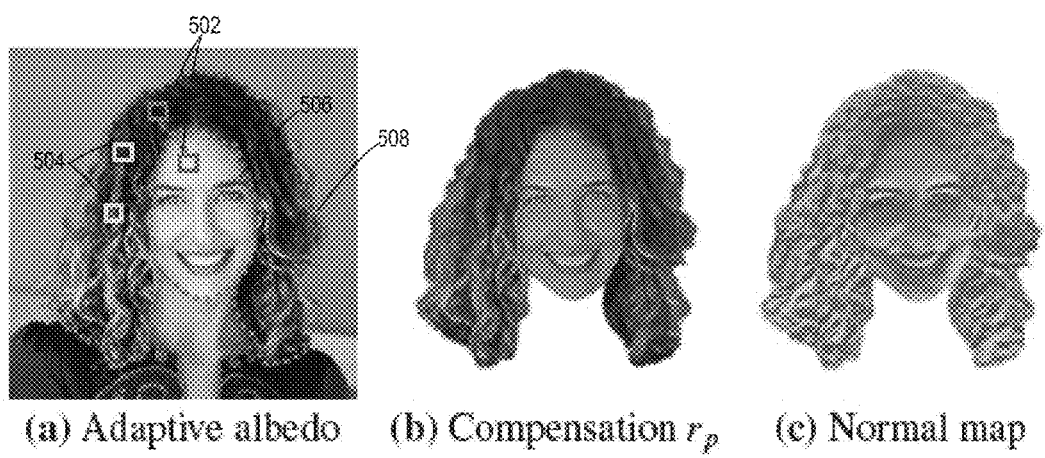
(a) Adaptive albedo
FIG. 5A
(b) Compensation $r_p$
FIG. 5B
(c) Normal map
FIG. 5C

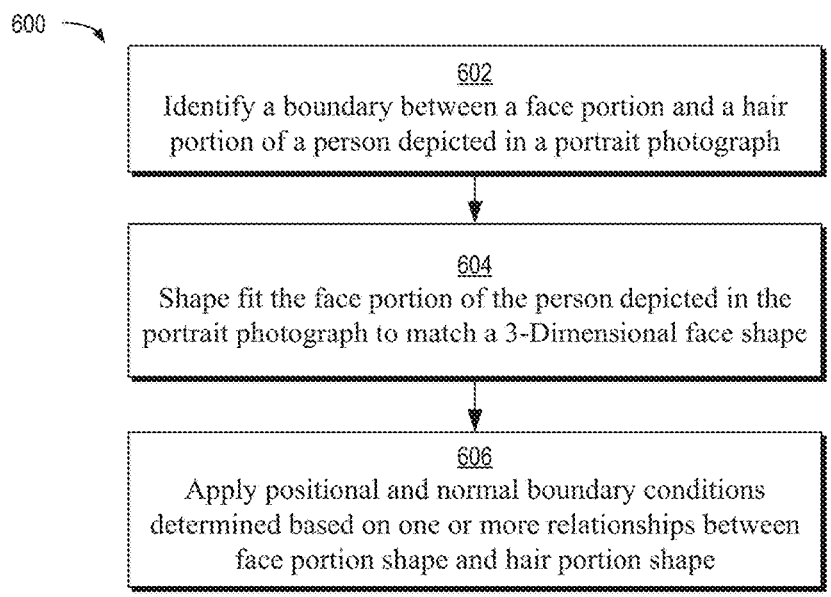
FIG. 6
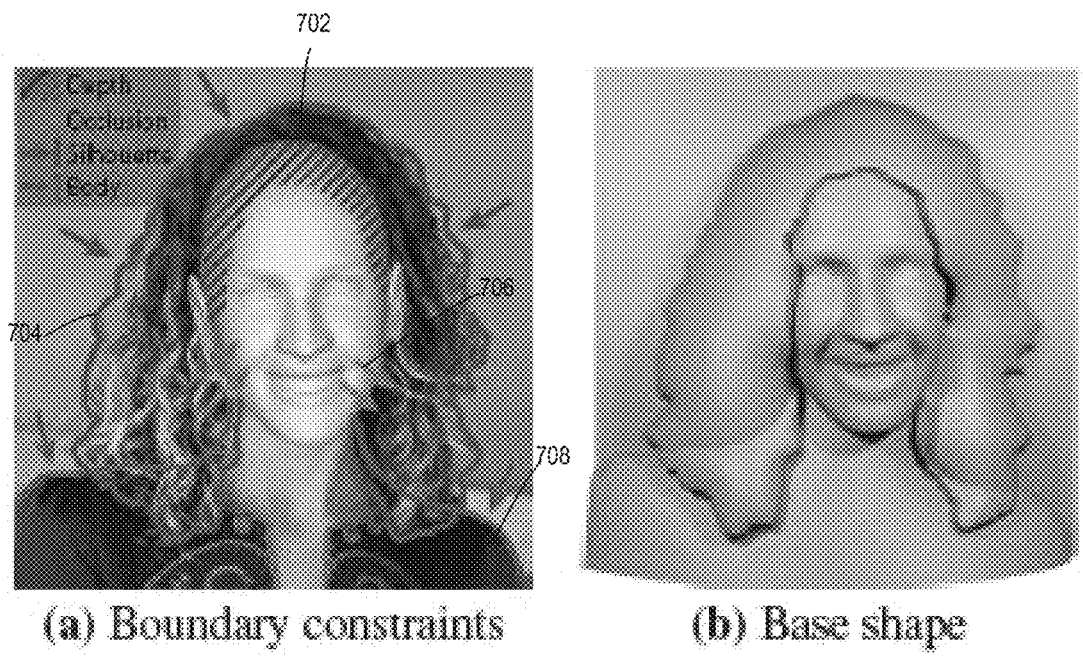
(a) Boundary constraints
FIG. 7A
(b) Base shape
FIG. 7B

3-DIMENSIONAL PORTRAIT RECONSTRUCTION FROM A SINGLE PHOTO

TECHNICAL FIELD

This disclosure relates generally to computer-implemented methods and systems and more particularly relates to improving the efficiency and effectiveness of computing systems used in estimating depth and 3-Dimensional (3D) attributes of objects depicted in photos.

BACKGROUND

The boom of digital entertainment, 3D printing, and virtual reality applications has led to interest in efficient and affordable ways to create 3D content. Despite the recent progress in 3D scanning for high-quality 3D content acquisition, most 3D scanning systems require expensive 3D equipment or lengthy scanning processes. Photos, on the other hand, are easy to capture and edit, and the ability to reconstruct 3D models directly from single photos could enable 3D content creation to users who do not have access to the specialized 3D equipment and lengthy scanning processes. However, reconstructing 3D shapes from single photos is a notoriously ill-posed inverse problem because photos are formed as a result of complex interactions between lighting, shape, and material properties. One approach to solve this problem is model-based techniques that use prior models to encode the shape variations of a specific object category. The shape of a human face can be well captured by such a model-based technique.

The shape of human hair, however, has not been well captured by model-based techniques because of hair's extreme variability and geometric complexity. Instead, existing single-view hair reconstruction methods have used local geometric cues such as hair occlusion and strand smoothness to reconstruct approximate hair models. Despite their adequacy for image-based rendering and editing tasks, hair models lack geometric accuracy. In addition, all model-based techniques are limited by the (usually low) dimensionality of the model and thus cannot recover characteristic fine-scale details from the photo.

Alternative methods have also failed to adequately account for the shape of hair and other detailed aspects of human portraits. Shape from Shading (SFS) methods can capture fine-scale geometric details (in the form of surface normals) for general objects from a single photo. However, existing SFS techniques cause incomplete and blurred reconstruction of hair structures because such techniques assume constant albedo, which does not apply to hair because most hairstyles have smoothly transitioned hair color. Using shape from shading techniques is also limited because their use requires knowing the lighting of the scene, which is often not known in the case of single photos.

Existing shape modeling techniques fail to adequately model hair and detailed aspects of human portrait photos and generally fail to model the hair and face in a single framework. As a result, existing techniques are inefficient and ineffective in providing 3D portrait reconstruction from single photos.

SUMMARY

Systems and methods are disclosed herein for 3-Dimensional portrait reconstruction from a single photo. A face portion of a person depicted in a portrait photo is detected and a 3-D model of the person depicted in the portrait photo constructed. In one embodiment, constructing the 3-D model involves fitting hair portions of the portrait photo to one or more helices. In another embodiment, constructing the 3-Dimensional model involves applying positional and normal boundary conditions determined based on one or more relationships between face portion shape and hair portion shape. In yet another embodiment, constructing the 3-Dimensional model involves using shape from shading to capture fine-scale details in a form of surface normal. The shape from shading is based on an adaptive albedo model that allows albedo estimate variation but limits size of albedo estimate variations between neighboring regions of the portrait photo or based on a lighting condition estimated based on shape fitting the face portion.

These illustrative embodiments and features are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings.

FIG. 4a shows an example of a face model fit to an input photo.

FIG. 4b shows an example of computing a pure skin region using the face model of FIG. 4a.

FIG. 4c shows an example of using the computed pure skin region of FIG. 4b to estimate the lighting environment.

FIG. 5 shows an example of a normal estimation method.

FIG. 6 is a flow chart illustrating an exemplary method used to construct a 3-D model from a single portrait photo using shape fitting with positional and normal boundary conditions.

FIG. 7a illustrates an example of a set of boundary constraints base shape construction.

FIG. 7b illustrates an example of a depth of the face model constructed using the set of boundary constraints of FIG. 7A.

DETAILED DESCRIPTION

Figure 1:
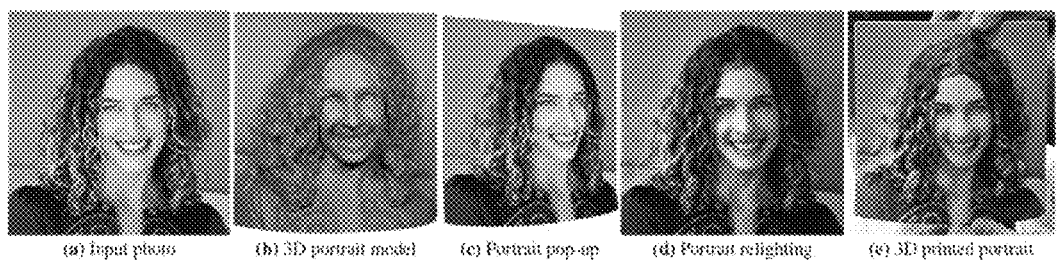
FIGS. 1a-e illustrate images depicting, from single input photo, reconstructing a high quality 3D portrait model that can be used to generate a portrait pop up, realistic portrait relighting with accurate shadowing effects, and a detailed 3D printed high-relief portrait.

Existing shape modeling techniques fail to adequately model the shape of hair and detailed aspects of human portrait photos and generally fail to model the hair and face in a single framework. This invention addresses these issues using a computer system that reconstructs a portrait model that includes both face and hair with gross geometric structures and fine-scale details from a single photo. One embodiment involves fitting hair portions of the portrait photo to one or more helices (i.e., using a helical hair prior) to recover integral hair structures and shape fitting the face portion of the person depicted in the portrait photo. The fitting of the hair to helices allows details of the hair to be captured more accurately than with prior techniques. The fitting of hair to helices and the fitting of the face to a face template are enforced in a single optimization used to reconstruct a portrait model representing the 3-D shape of the person in the portrait. Using a single optimization to reconstruct both the hair and face portions improves processing efficiency and the accuracy of the 3-D model.

One embodiment additionally or alternatively applies positional and normal boundary conditions determined based on one or more relationships between face portion shape and hair portion shape. In one example, user input identifying the boundary between a face portion and a hair portion is used in determining a positional condition requiring that the hair portion must attach to a front of the face portion. Enforcing boundary conditions in an optimization used to reconstruct both the hair and face portions of a person from a portrait photo improves the accuracy of the reconstructed 3-Dimensional shape.

Shape from shading can additionally or alternatively be used to improve the fine scale modeling of the face and/or hair portions. One embodiment involves using shape from shading to capture fine-scale details in a form of surface normals. The shape from shading, in one embodiment, is based on an adaptive albedo model that allows albedo estimate variation but limits size of albedo estimate variations between neighboring regions of the portrait photo. The use of an adaptive albedo model allows shape from shading to be used to more accurately determine the details of regions (particularly the hair) in which the color smoothly changes.

The shape from shading, in one embodiment, is based on a lighting estimate that is determined by shape fitting the face of the portrait.

These improved shape from shading techniques, using adaptive albedo and/or lighting estimates based on shape fitting the face, improve the accuracy and feasibility of using the technique in circumstances in which the light source is unknown and/or the color of the material (e.g., hair, face) changes in the individual.

The combination of these shape from shading techniques with the face fitting and/or hair fitting techniques using a single optimization framework allows 3-D features to be captured at differing levels of detail in the hair, face, and other portions of a portrait image. Generally, the face fitting captures a high level of detail of the large-scale features of the person, the hair fitting captures a middle level of detail of the hair portion of the person, and the shape from shading captures fine details of the face and/or hair portions.

The techniques achieve both high quality and robust reconstruction of 3-D portraits from a wide range of photos with different identities, facial expressions, and hairstyles.

As used herein, the phrase "portrait photo" refers to an image of some or all of a person that includes the person's head that is captured by a camera, scanner, or other image capture device.

As used herein, the phrase "shape fitting" refers to matching a shape in an image with a shape from another image for which depth information is known. For example, the face in a portrait image may be matched to a face in another image based on the faces having similar proportions, features, or other attributes.

As used herein, the phrase "albedo" refers to the fraction of incident light reflected by an object.

As used herein, the phrase "lighting condition" refers to any aspect of lighting that impacts the appearance of an object or a portion of an object in an image. For example, the location of a light source is a lighting condition.

FIGS. 1a-e illustrate, from a single input photo (FIG. 1a), reconstructing a high quality 3D portrait model (FIG. 3b) that can be used to generate a portrait pop up (FIG. 1c), realistic portrait relighting with accurate shadowing effects (FIG. 1d), and detailed 3D printed high-relief portrait (FIG. 1e). A high quality 3D portrait model generated using the techniques disclosed herein can be used in numerous other contexts and purposes.

Given a single portrait photo, a 3D portrait model is built that captures both the gross geometric structure and fine scale details of a portrait, including both the face portion and the hair portion. Representing this model as a depth map allows combining the detailed normals from shape from shading and various geometric cues derived from the input photo in a single optimization framework.

Figure 2:
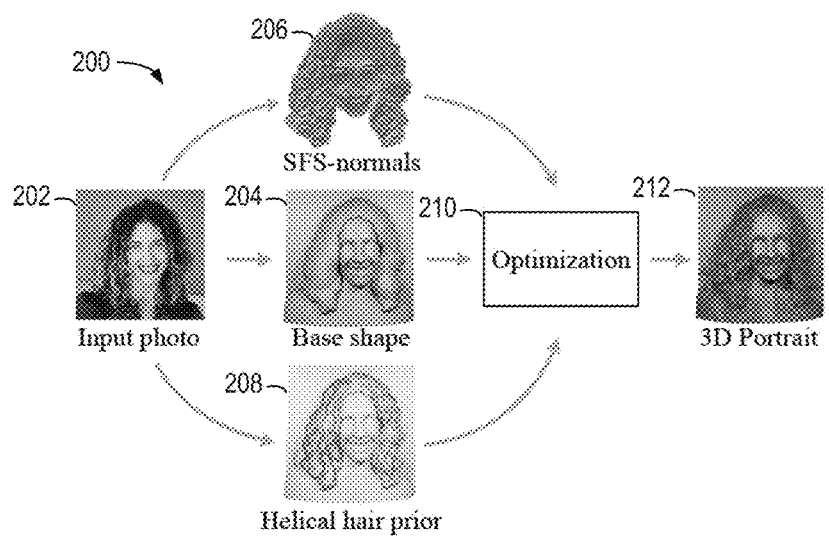
FIG. 2 is a process chart that provides an overview of an exemplary process combining multiple models into a single optimization framework.

FIG. 2 provides an overview of an exemplary process combining multiple models into a single optimization framework. This example uses a single input photo 202. In this example, a bilinear 3D face model is fitted to the facial landmarks detected in the photo 202 to identify a base shape 204. This provides the coarse geometry with the right pose, identity and expression of the subject. The low-resolution surface normals of this coarse geometry are derived and used to infer the environment lighting from the observed images intensities. The lighting is represented using the quadratic lighting model which has been shown to approximate natural illumination well.

Shape from shading (SFS) normals 206 are estimated per-pixel for the face and hair from the observed image intensities based on the inferred lighting and an adaptive albedo model that accounts for the albedo variations on both face and hair. The normals estimated by the shape from shading (SFS-normals) capture local variations in geometry, and reconstructing the 3D portrait based on them alone could lead to results with low-frequency biases. To avoid this, a low-frequency portrait base shape 204 is constructed to guide the reconstruction based on one or more face models and silhouettes of hair and body. These silhouettes can be easily detected from simple user input, e.g., drawing strokes drawn in the respective region using image selection tools. The face region of the base shape is generated directly from the base shape 204. The body portion is constructed based on the body silhouettes and the hair portion is built from hair silhouettes, depth constraints of the face model, and face-hair occlusion relationships.

Reconstruction using SFS-normals and the base shape only partially recovers hair structures. To articulate the hair structures in the reconstruction, a helical hair prior is introduced. Hair strands are modeled as piece-wise helices. To formulate the prior, helical hair structures are discovered from the input photo using a RANSAC-based approach. The pixels of the hair are clustered into super-pixels based on hair orientation and proximity using k-way graph cuts. Each super-pixel is then fit with the best 2D projection of 3D helix on a set of rotated axes. Adjacent super-pixels that can be fit with the same helix are iteratively combined to construct long 2D helix projections. The 3D helix parameters for these 2D helix projections are recovered and used as the helical hair prior to constrain the optimization to match these hair structures.

SFS-normals 206, the base shape 204, and the helical hair prior 208 are used in a single optimization using different energy terms:

$$E = \lambda_n E_n + \lambda_b E_b + \lambda_h E_h.$$

where $E_n$, $E_b$ and $E_h$ are the energies for SFS-normals 206, the base shape 204, and the helical hair prior 208, respectively.

The shape from shading used in this optimization used to determine shapes in portrait images can be improved with respect to quality and efficiency over conventional shape from shading by basing the shape from shading on a lighting estimate and/or an adaptive albedo model.

Figure 3:
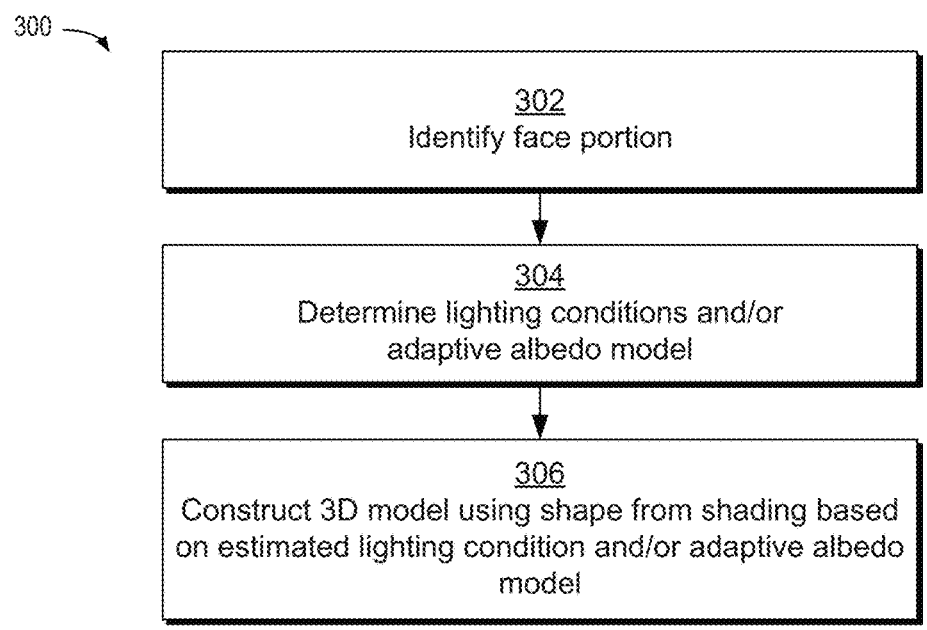
FIG. 3 is a flow chart illustrating an exemplary method used to construct a 3-D model from a single portrait photo using shape from shading.

FIG. 3 is a flow chart illustrating an exemplary method 300 used to construct a 3-Dimensional model from a single portrait photo using shape from shading basing the shape from shading on a lighting estimate and/or an adaptive albedo model. The method 300 involves a processor of a computing device performing operations illustrated in blocks 302, 304, and 306. The exemplary method 300 involves identifying a face portion of a person depicted in a portrait photo, as shown in block 302. The face portion can be identified using an automated algorithm (e.g., comparing the photo with images of previously identified faces), based on user input (e.g., drawing a boundary around the face), or any other appropriate technique. The exemplary method 300 further involves determining lighting conditions and/or an adaptive albedo model, as shown in block 304, and constructing a 3D model using shape from shading based on the estimated lighting condition and/or the adaptive albedo model, as shown in block 306. The adaptive albedo model allows albedo estimate variation but limits the size of albedo estimate variations between neighboring regions of the portrait photo.

In this way, shape from shading enhanced by an estimated lighting condition and/or adaptive albedo model can be used to capture fine-scale details in a form of surface normal. This can be combined with one or more additional techniques that capture the larger scale shape of the person in the portrait image. In one example, the 3-Dimensional model is constructed using an energy function that accounts for the shape from shading, a shape fitting of the face, and/or a hair fitting model.

Model-Based Face Fitting

Thus, in one embodiment, a face fitting model is used for multiple purposes. First, the face fitting model is combined with one or more of the other models (e.g., shape from shading and hair fitting) in an optimization used to determine the shape of the person in the portrait. Second, the face fitting model is separately used to estimate lighting used in the shape from shading. Different face fitting techniques can be used for these purposes, however, in one embodiment it is more efficient to use a single face fitting technique for both purposes.

Face fitting can be accomplished using any appropriate face fitting technique. In one example, a morphable face model is fitted to the input photo. Morphable face models represent face geometry as a linear combination of low-dimensional basis vectors. This low-dimensional space is computed using principle component analysis on captured 3D face geometry data and is designed to capture the variation in face geometry over different identities and expressions. Given a set of detected facial landmarks on an input photo, the rigid pose and the coefficients of the morphable face model that minimize the distance between the projected landmarks and the detected ones are recovered. The recovered rigid pose and basis coefficients define the full face model. Facial landmarks are detected and the identity and expression coefficients of the morphable face model are estimated using an iterative optimization. The 3D face model is projected back to the image plane to approximately determine the face region of the subject, and estimate a per-pixel depth, and normal, in this region. The pixel intensities are estimated in the region to estimate the average skin color. To further remove the regions with different albedo color (eyes, mouth, and facial hair) or shadows, the face region is shrunk to estimate pure skin regions, by clustering the chrominance values of the pixels in the face region. In addition, user input, e.g., drawing strokes, can be used to segment the hair region.

Lighting Estimation for SFS Based on Model-Based Face Fitting

FIGS. 4*a-c* show an example of face model fitting and skin area segmentation for lighting estimation. In this example, a face model 402 is fit to the input photo 404 (FIG. 4*a*), and a computed pure skin region 406 is computed (FIG. 4*b*) and used to estimate the environment lighting (FIG. 4*c*). The morphable face model 402 fit to the photo 404 gives a very coarse geometry that is restricted to the face region. This face geometry is used to estimate the lighting in the image and this lighting is used to perform SFS computation to recover per-pixel SFS-normal in both the face and hair regions. Shape estimation based on natural lighting is better constrained and more accurate than otherwise.

In one embodiment, the scene illumination is estimated using a quadratic lighting model, $\mathcal{L}(A, b, c)$. The shading induced by this lighting model at every pixel in the scene is calculated as:

$$I_p = \mathcal{L}(A,b,c) * n_p = n_p^T A n_p + b^T n_p + c,$$

where $I_p$ and $n_p$ are the observed color and surface normal at pixel p respectively, and A, b, and c are the parameters of the lighting model. This model does not account for the albedo at pixel p; for uniform albedo regions it gets rolled into the lighting parameters. Variations in the albedo are accounted for during normal estimation as explained below.

The coarse face geometry reconstructed using the morphable face model is used to estimate the lighting parameters. The lighting coefficients are estimated by minimizing the following linear least squares system:

$$\underset{A,b,c}{\arg\min} \sum_{p \in \Omega_x} \|\mathcal{L}(A, b, c) * n_p^f - I_p\|^2.$$

This optimization is regularized using:

$$\lambda \|A\|^2 + \lambda \|b\|^2 + \lambda c^2, \lambda = 0.01$$

These three parameters are solved for in every color channel independently, thus we have $A^1$, $b^1$, $c^1$, $1 \in \{R, G, B\}$. Because the albedo is not accounted for in this model, the error function is restricted to the detected facial skin region to ensure a roughly uniform albedo. FIG. 3*c* shows an example of the lighting estimated using this method.

Shape From Shading Based on the Lighting Estimation and Adaptive Albedo

Shape from shading is used to estimate a detailed SFS-normal $n_p^{SFS}$ at each pixel p of the input portrait photo. The energy for SFS normals is written as:

$$E_n = \sum_p \|\nabla d_p - n_p^{SFS}\|^2$$

where $d_p$ is the depth value of p in the final depth map.

Given the pre-computed lighting discussed above, SFS-normals can be recovered by minimizing the following data term:

$$E_p(n_p) = \sum_{l \in \{R,G,B\}} \|\mathcal{L}(A^l, b^l, c^l) * n_p - I_p^l\|^2.$$

There are two issues with the normals estimated using this energy term. Firstly, optimizing for per-pixel normals independently will lead to noisy estimates. This is resolved by adding two pair-wise smoothness terms:

$$E_s(n_p) = \sum_{q \in \mathcal{K}(p)} \|n_p - n_q\|^2$$

$$E_i(n_p) = \|\nabla \times n_p\|^2.$$

The first term enforces normal similarity between neighboring pixels, and the second term enforces that the estimated normals are integrable by penalizing the curl of the normal vector field around each pixel.

Secondly, because the albedo was not accounted for in the lighting model, deviations from the mean skin color (which is subsumed into the lighting model) will lead to error in the normal estimates. This is especially problematic in the hair regions because a) the albedo of hair is often dramatically different from that of the face, and b) hair regions typically have a lot of albedo variation, shadowing, and ambient occlusion that are not handled in the shading model. An adaptive albedo model accounts for these issues by defining a relative compensation $r_p$ at each pixel in order to handle both the global albedo differences and local shading variation:

$$r_p = r_0 r'_p, r'_p \in [r_{min}, r_{max}].$$

In this equation, $r_0$ accounts for global deviations in the albedo from the mean skin color; in the face regions, it is set to 1, and in the hair region, it is set to the ratio of the average color of hair region over face region, i.e., $$r_0 = (\Sigma_{p \in \Omega_h} I_p / |\Omega_h|) / (\Sigma_{p \in \Omega_s} I_p / |\Omega_s|).$$

$r'_p$ is a per-pixel grayscale compensation term bounded by $r_{min}$ and $r_{max}$ that accounts for local shading and shadowing effects.

The following equation is used to account for the relative compensation $r_p$ at each pixel:

$$E_p(n_p) = \sum_{l \in \{R,G,B\}} \|r_p \mathcal{L}(A^l, b^l, c^l) * n_p - I_p^l\|^2.$$

To ensure that this optimization is well-constrained, a smoothness constraint for rp is imposed:

$$E_r(r_p) = \sum_{q \in \mathcal{K}(p)} \|r_p - r_q\|^2.$$

The final energy combines $E_p$, $E_s$, $E_i$ and $E_r$, and this constrained nonlinear least-squares system is solved iteratively on a patch basis. In addition, normal vectors can be constrained to remain unit length within each patch. Solving for an optimal solution (i.e. one that minimizes the combined energy terms) can be done in a number of ways using standard library packages for solving constrained non-linear least squares systems. One embodiment, uses the well-known Levenberg-Marqaurdt method to find an optimal solution. The Levenberg-Marquardt method is a solver for non-linear least squares problems that improves convergence by approaching the solution with adaptive bias towards the gradient direction. During each iteration, patches are solved in a sweep-line order, allowing updated information to be propagated across overlapping patches to ensure proper global constraints.

FIG. 5 shows an example of a normal estimation method. An adaptive albedo model is used to account for the albedo variations on face and hair that defines a relative compensation $r_p$ (FIG. 4b) to handle both global albedo differences between face and hair 402 and local shading variation 404 within each face region 406 and hair region 408, shown in FIG. 4a. The estimated normal map is shown in FIG. 4c. The adaptive albedo model can account for significant differences between the albedo of the face and hair regions, as well as smooth albedo variations along the hair by the relative compensation $r_p$. By incorporating the albedo compensation terms, the normals across the face and hair are robustly estimated.

Rough Base Shape Estimation

The normals estimated using the albedo-compensated shape from shading method capture the geometric details in the hair and face regions well. However, there may be small errors in each per-pixel estimate and directly integrating them to reconstruct depth could lead to reconstructions with gross low-frequency errors. This is significant because, in faces, even small distortions are often easily noticed. To address this concern, the fine-scale geometry from SFS-normals can be combined with a rough base shape for the portrait that constrains the geometry at a large-scale level.

Different regions of the base shape can be calculated. For example, different regions may be calculated in the back-to-front occlusion order: background, face, body and hair. A set of different boundary constraints may be used to construct each region. The energy term for the base shape is defined as:

$$E_b = \sum_p \|d_p - d_p^b\|^2.$$

The base shape in the face and background regions can be determined in a straightforward manner. For example, the depth can be directly assigned from the fit face model as the face base shape, and the base depth (roughly across the center line of head for the background) used.

FIG. 6 is a flow chart illustrating an exemplary method 600 used to construct a 3-D model from a single portrait photo using shape fitting with positional and normal boundary conditions. The method 600 involves a processor of a computing device performing operations illustrated in blocks 602, 604, and 606. Method 600 involves identifying a face portion of a person depicted in a portrait photo, as shown in block 602. This can be performed automatically or based on user input, for example, drawing an approximate boundary around the face.

Method 600 involves identifying a boundary between a face portion and a hair portion of a person depicted in a portrait photo, as shown in block 602. The boundary may be automatically determined or determined based on user input. For example, user input drawing markings may be received to identify the boundary between the face portion and the hair portion.

Method 600 further involves shape fitting the face portion of the person depicted in the portrait photo to match a 3-Dimensional face shape, as shown in block 604. This shape fitting involves matching the face portion with an existing face shape, for example, based on similarities between the face portion and the existing face shape.

Method 600 further involves applying positional and normal boundary conditions determined based on one or more relationships between face portion shape and hair portion shape, as shown in block 606. The shape fitting and application of positional and normal boundary conditions are performed to construct a 3-D model of the person depicted in the portrait photo. In one embodiment, the positional conditions include a condition requiring that the hair portion must attach to a front of the face portion. In one embodiment, the normal conditions include a condition specifying how a normal must be oriented along the contour of the hair and the body. Position constraints requiring that the hair to lie over the body and/or shoulder can also be specified. This use of boundary conditions to solve for smooth systems facilities provides the shape based on contour information. The boundary conditions are based on relationships between face and hair based on user input defining (or automatic determinations of) the boundaries. Combining positional relationships and normal constraints on boundary improves the accuracy of the shape determination.

FIGS. 7a-b illustrate an example of base shape construction. This example uses a set of boundary constraints illustrated in FIG. 7a to construct the depth of the face model shown in FIG. 7b. In this example, and the hair silhouettes 704, the body silhouettes 708, and the occlusion relationship between the face and hair 706, and depth relationship 702 are used to construct the depth of the face model shown in FIG. 7b. To construct the base shape in the body region, body silhouettes are identified. In one example body silhouettes are indicated by simple user strokes along the rough body boundary. The base shape in the region W can then be obtained by minimizing:

$$\operatorname*{argmin}_{d_p} \sum_{\Omega^*} \|d_p - d_p^*\|^2 + \sum_{\partial\Omega} \|n_p - \nabla\Omega\|^2 + \sum_{(p,q)\in\Omega} \|n_p - n_q\|^2,$$

where $d_p^*$ is the depth constraints in the constrained region $\Omega^*$, in this case $\Omega^*$ is the body silhouette and $d_p^*$ is the background depth values on $d_p^*$. $\partial\Omega$ is the silhouette of the region and $\nabla\Omega$ denotes the gradient of the region and it is used to enforce that the normal $n_p$ of the region lie in the same direction as $\nabla\Omega$, or in other words, orthogonal to the viewing direction.

The base shape of hair can be constructed in a similar way using this equation. The constrained region $\Omega^*$ is the hair region that occludes face and body, which can be obtained by simple intersection between the regions. The term $d_p^*$ denotes the depths of the face and body constructed previously. Similarly, the normal constraints on $\partial\Omega$ apply to the normals of the hair silhouettes.

Shape Integration

The SFS-normals and the base shape are merged to reconstruct a portrait depth map with the global shape of the base shape and geometric details in SFS-normals. Combining both depth and normal information corresponds to the first two terms in:

$$E = \lambda_n E_n + \lambda_b E_b + \lambda_h E_h.$$

where the parameter $\lambda_n$ and $\lambda_b$ control how strongly the SFS normal or the original base shape is to be preserved. While the hair region requires more enhancement, enhancing detail on the face too much may lead to artifacts. This is addressed by using $\lambda_n = 0.1$, $\lambda_b = 0.9$ and $\lambda_n = 0.6$, $\lambda_b = 0.4$ for the face and hair regions respectively.

Hair Fitting

Combining the base shape with SFS-normals provides reconstructions with nice visual detail. However, the reconstruction may not capture the rich structural detail in the hair region. Hair has complex geometric and material properties. Hair also has local lighting effects that violate the shading model. Patch-based reconstruction is robust to this but at the cost of blurring out some of the hair detail. To address this, a geometric prior is used for hair to capture intricate hair structures. Hair can be approximated well by piece-wise 3D helices. These structures are inferred from the input photo by clustering pixels with consistent hair orientation and color and fitting 2D projected helical models to the clusters. The depth computed from the base shape and SFS-normals is used to recover the true 3D helices. Depth continuity is enforced along these inferred 3D helices as the energy term $E_h$ in the equation.

$$E = \lambda_n E_n + \lambda_b E_b + \lambda_h E_h.$$

Figure 8:
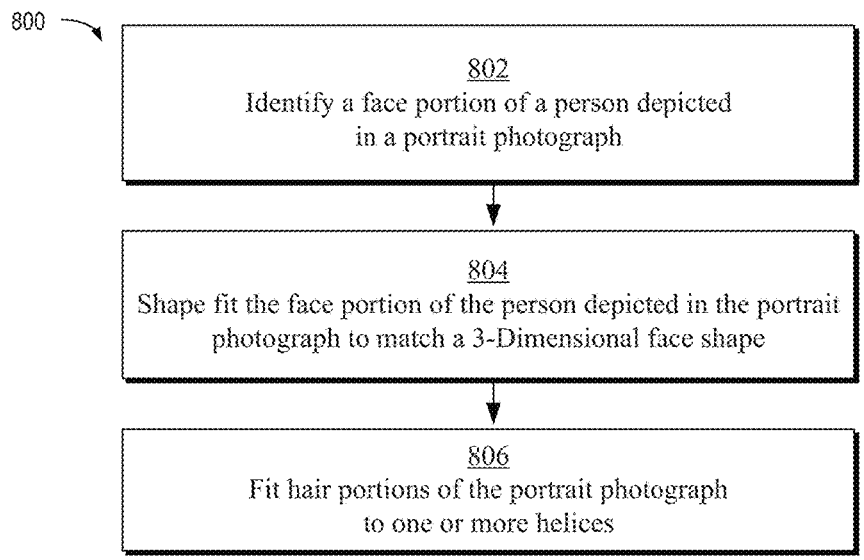
FIG. 8 is a flow chart illustrating an exemplary method used to construct a 3-D model from a single portrait photo.

FIG. 8 is a flow chart illustrating an exemplary method 800 used to construct a 3-Dimensional model from a single portrait photo. The method 800 involves a processor of a computing device performing operations illustrated in blocks 802, 804, and 806. The exemplary method 800 involves identifying a face portion of a person depicted in a portrait photo, as shown in block 802. The face portion can be identified using an automated algorithm (e.g., comparing the photo with images of previously identified faces), based on user input (e.g., drawing a boundary around the face), or any other appropriate technique. The method 800 further involves constructing a 3-Dimensional model of the person depicted in the portrait photo. This construction of a 3-Dimensional model involves shape fitting the face portion of the person depicted in the portrait photo to match a 3-Dimensional face shape, as shown in block 804, and fitting hair portions of the portrait photo to one or more helices, as shown in block 806.

In one embodiment, fitting the hair portions of the portrait photo to one or more helices involves identifying super-pixel clusters as the hair portions and fitting a respective helix model to one or more of the super-pixel clusters. This can involve fitting a 2-Dimensional helix model to one or more of the super-pixel clusters and recovering corresponding 3-D structure of the 2-Dimensional helix model by estimating depths using base shape and shape from shading and by enforcing the 3-D structure in a portrait reconstruction process. Additionally or alternatively, fitting hair portions of the portrait photo to one or more helices can involve constructing long helices by incrementally merging compatible neighboring segments into multi-cluster helices.

In one embodiment, the use of super-pixel clustering involves computing a robust orientation map of the portrait photo using a bank of oriented filters that are uniformly sampled in [0, π). By analyzing the convolution response at each angle, the orientation $\theta_p$ can be chosen with maximum response and the corresponding confidence value $c_p$ calculated by measuring how distinct it is compared to other angles. A set of cluster seed pixels is then sampled that satisfies the following conditions: a) its confidence is no less than a threshold i.e., $c_p \geq c_{min}$, and b) its confidence is locally maximal in a neighboring window. These samples are used as cluster centers, and k-way graph cuts are applied to segment the image pixels into super-pixels, C, using both color and orientation distance:

$$w_{(p,q)} = w_c |c_p - c_q| + w_\theta |\theta_p - \theta_q|.$$

In one embodiment, helix fitting involves a single cluster helix fitting. A single 3D helix $\mathcal{H}$ can be parametrized within a local frame (with its main axis aligned with the z-direction) in terms of a coordinate, t, as:

$$\mathcal{H}(t) = \begin{cases} x(t) = a \cos(t) + m_x, \\ y(t) = b \sin(t) + m_y, \\ z(t) = c\, t + d_z. \end{cases}$$

Projecting it to a 2D plane (while denoting rotation about y-axis with φ) gives a cycloid curve, $\mathcal{H}^*$:

$$\mathcal{H}^*(t) = \begin{cases} x(t) = a \sin(\phi)\cos(t) + c\, \cos(\phi)t + m_x, \\ y(t) = b \sin(t) + m_y, \end{cases}$$

with the tangent given by:

$$\dot{\mathcal{H}}^*(t) = \frac{b \cos(t)}{-a \sin(\phi) \sin(t) + c \cos(\phi)}.$$

The 2D helix model is fit to each super-pixel cluster, $C_i$, estimated in the previous step. Given the super-pixel points with 2D position p and orientation tangent $\dot{p}$, a single helix can be fit to them by solving the equation:

$$\underset{t_p, \mathcal{H}^*}{\operatorname{argmin}} \sum_p \|p - \mathcal{H}^*(t_p)\|^2 + \|\dot{p} - \dot{\mathcal{H}}^*(t_p)\|^2 + w_r \|t_p\|^2,$$

where the last term penalizes over-fitting by minimizing the parameter coordinate of every point. The fitting process also needs to determine the local orientation of the 2D frame in which the helix is defined. Incorporating it in the energy term above may greatly complicate optimization. Instead, a set of helix axes is uniformly sampled and the remaining parameters estimated by solving the equation for each axis. The axis with the minimal fitting error is chosen as the final result. Uniformly sampling 32 orientations may be sufficient for certain embodiments.

In one embodiment, helix fitting involves multiple-cluster helix fitting. The 2D projected helices fit to single super-pixel clusters are often too short and ambiguous to generate 3D helices that are long and accurate enough to extract large scale hair structures. Therefore, long helices are constructed by incrementally merging compatible neighboring single cluster segments into multi-cluster helices. In each iteration of this process, a single-cluster helix $\mathcal{H}^*_i$ is used as a start, all its neighboring clusters $C_{\mathcal{H}^*}$ are collected, and, for each pair of clusters, re-fit a new helix, $\mathcal{H}^*_{i+1}$. The fitting score is measured as the average fitting error across all the merged clusters:

$$e(\mathcal{H}^*) = \frac{\sum_{p \in C_{\mathcal{H}^*}} \|\mathcal{H}^*(t_p) - p\|^2}{|C_{\mathcal{H}^*}|}.$$

If the fitting score is below a set threshold $e \geq e_{min}$, the clusters are merged and used for further extension. When this iteration is terminated for every helix, the redundant helices that belong to an identical set of initial clusters (only keep the one with minimal fitting error) are removed, and all helices with length less than a threshold $l_{min}$, e.g., 50 pixels.

To improve the fitting performance, the assumption that the new helix, $\mathcal{H}^*_{i+1}$, shares the same axis as the previous helix $\mathcal{H}^*_i$ is made, so that sampling axes again as in the single-cluster fitting is not necessary.

In embodiments in which a set of sparsely distributed 2D helix projections is inferred, their corresponding 3D structures are recovered by making use of the estimated depths using the base shape and SFS normals, and this 3D structure is enforced in the portrait reconstruction process. In order to recover a 3D helix from the 2D projections, the rotation angle relative to the projection plane, φ, is estimated and the displacement vector $d_z$ along the projection axis. The value φ encodes the convex/concave ambiguity when a 3D helix is projected on to a 2D plane, and plays a critical role in resolving the 3D structure.

The unknown depth component of the projected 3D helix is then:

$$d(\mathcal{H}^*(t)) = \cos(\phi)(a \cos(t) + b \sin(t)) + c \sin(\phi)t + m_z.$$

In order to estimate it, the model depth, $d_p$ reconstructed using only the base shape and SFS-normals is used. The 2D helices are projected on to this model, and the depth at pixels ($t_p$, $d_p$) sampled along the project 2D helices. Optimal values of φ and $d_z$ are solved for that best fit this depth map for complete 3D helices (still within the local frame that rotates around the z-axis):

$$\underset{\phi, d_p}{\operatorname{argmin}} \sum_p \|d(\mathcal{H}^*(t_p)) - d_p\|^2.$$

The recovered parameters are used to recover the 3D helix depth, $d_p^h$. The energy term $E_h$ for helical hair prior is then defined by:

$$E_h = \|d_p - d_p^h\|^2$$

in:

$$E = \lambda_n E_n + \lambda_b E_b + \lambda_h E_h.$$

In one embodiment, $\lambda_h = 0.1$.

Figure 9:
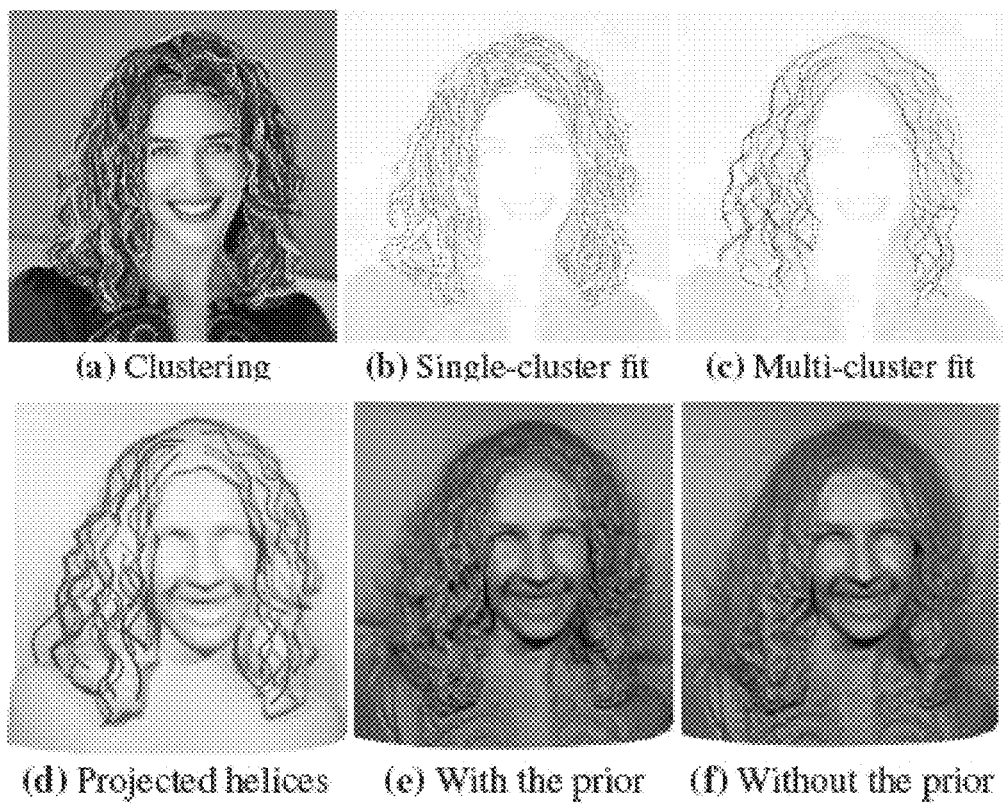
FIG. 9 illustrates a helix fitting example.

FIG. 9 illustrates a helix fitting example. Given an input photo, a super-pixel clustering is performed based on pixel proximity and similarity of orientation (FIG. 9a). Single-cluster fitting (FIG. 9b) then fits the best helix for each super-pixel followed by a multi-cluster fitting (FIG. 9c) to merge neighboring compatible helices into longer helices. These helices are then projected back to the model to resolve ambiguous parameters (FIG. 9d). Using these projected helices as the helical hair prior, the optimization can recover intricate hair structures (FIG. 9e), compared to the incomplete and blurred hair structures without this prior (FIG. 9f).

Portrait relighting can also be significantly improved using the techniques disclosed herein. A relighting implementation cannot only take into account the portrait geometry, but also grow virtual hair strands in the hair region and use a realistic hair appearance. The techniques disclosed herein can recover accurate hair-face shadowing and hair self-shadowing effects and enable realistic moving highlights on hair as the lighting changes. The techniques disclosed herein can produce a model that can be used to create a 3-Dimensional physical object, for example, using a 3-D printer.

Exemplary Computing Environment

Figure 10:
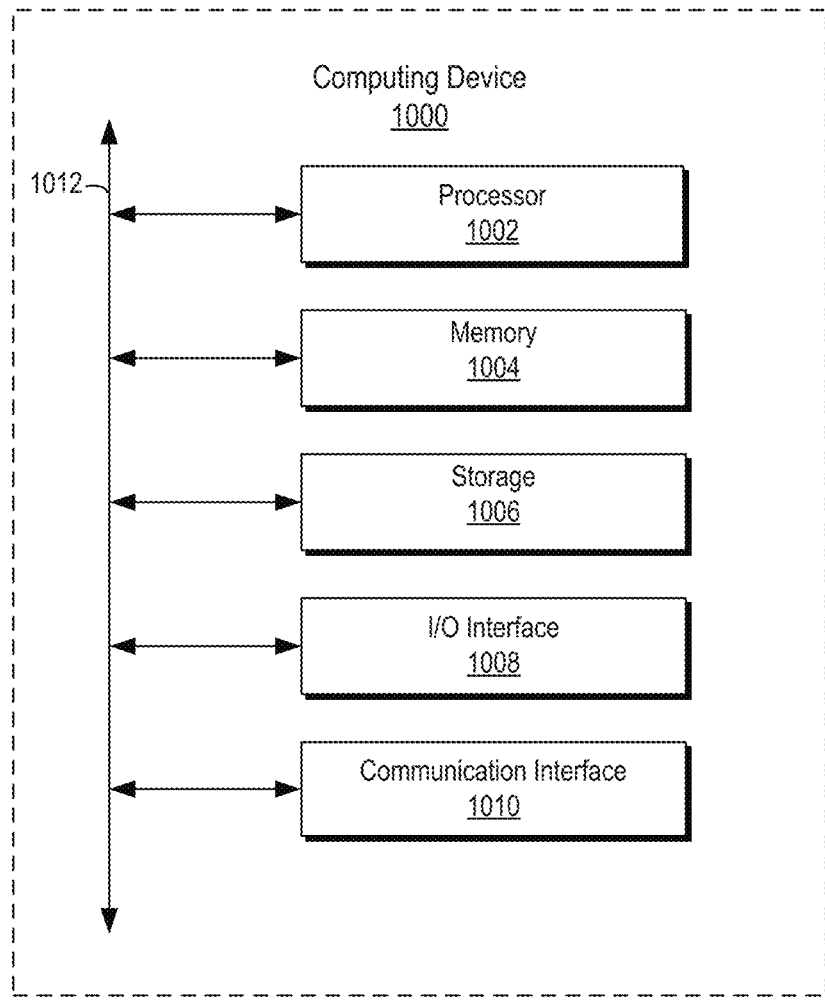
FIG. 10 is a block diagram depicting example hardware implementations.

Any suitable computing system or group of computing systems can be used to implement the techniques and methods disclosed herein. For example, FIG. 10 is a block diagram depicting examples of implementations of such components. The computing device 1000 can include a processor 1002 that is communicatively coupled to a memory 1004 and that executes computer-executable program code and/or accesses information stored in the memory 1004 or storage 1006. The processor 1002 may comprise a microprocessor, an application-specific integrated circuit ("ASIC"), a state machine, or other processing device. The processor 1002 can include one processing device or more than one processing device. Such a processor can include or may be in communication with a computer-readable medium storing instructions that, when executed by the processor 1002, cause the processor to perform the operations described herein.

The memory 1004 and storage 1006 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The computing device 1000 may also comprise a number of external or internal devices such as input or output devices. For example, the computing device is shown with an input/output ("I/O") interface 1008 that can receive input from input devices or provide output to output devices. A communication interface 1010 may also be included in the computing device 1000 and can include any device or group of devices suitable for establishing a wired or wireless data connection to one or more data networks. Non-limiting examples of the communication interface 1010 include an Ethernet network adapter, a modem, and/or the like. The computing device 1000 can transmit messages as electronic or optical signals via the communication interface 1010. A bus 1012 can also be included to communicatively couple one or more components of the computing device 1000.

The computing device 1000 can execute program code that configures the processor 1002 to perform one or more of the operations described above. The program code can include one or more of the modules of FIG. 2. The program code may be resident in the memory 1004, storage 1006, or any suitable computer-readable medium and may be executed by the processor 1002 or any other suitable processor. In some embodiments, modules can be resident in the memory 1004. In additional or alternative embodiments, one or more modules can be resident in a memory that is accessible via a data network, such as a memory accessible to a cloud service.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. In a computing environment, a method implemented by a computing device for constructing a 3-Dimensional model from a single portrait photo, the method comprising:

receiving, by a processor of the computing device, an image file including a two-Dimensional portrait photo;

identifying, by the processor, a hair portion of a person depicted in portrait photo;

constructing, by the processor, a 3-Dimensional model of the hair portion of the person depicted in the portrait photo, wherein constructing the 3-Dimensional model of the hair portion comprises fitting the hair portion of the portrait photo to one or more helices by:

clustering pixels of the portrait photo corresponding to the hair portion into multiple super-pixel clusters, wherein pixels of close proximity and aligned orientation below a threshold are added to a super-pixel cluster of the multiple super-pixel clusters; and fitting one or more helix model corresponding to the one or more helices to each super-pixel cluster of the multiple super-pixel clusters; and storing, by the processor, a modified image file including the 3-Dimensional model of the hair portion.

2. The method of claim 1 wherein constructing the 3-Dimensional model comprises:

recovering corresponding 3-Dimensional structure of the helix model by estimating depths using base shape and shape from shading and by enforcing the 3-Dimensional structure in a portrait reconstruction process.

3. The method of claim 1 wherein fitting the hair portion of the portrait photo to one or more helices comprises constructing long helices by incrementally merging compatible neighboring segments of the multiple super-pixel clusters into multi-cluster helices.

4. The method of claim 1 wherein constructing the 3-Dimensional model of the hair portion comprises:

identifying positional and normal boundary conditions based on at least one relationship between an expected face shape of the person and an expected hair portion shape; and using the positional and normal boundary conditions to constrain the 3-Dimensional model that is constructed.

5. The method of claim 1 wherein constructing the model further comprises using shape from shading to capture the fine-scale details in a form of surface normals.

6. The method of claim 1, further comprising constructing a 3-Dimensional model of a face portion of the person depicted in the portrait photo by shape fitting the face portion of the person depicted in the portrait photo to match a 3-Dimensional face shape;

determining a lighting condition estimate based on shape fitting the face portion; and using shape from shading to capture the fine-scale details in a form of surface normals; and using the lighting condition as a basis for the shape from shading.

7. The method of claim 1 wherein constructing the 3-Dimensional model further comprises using shape from shading to capture the fine-scale details in a form of surface normals, the shape from shading based on an adaptive albedo model that allows albedo estimate variation but limits albedo estimate variations between neighboring regions of the portrait photo.

8. The method of claim 1 wherein constructing the 3-Dimensional model comprises using an energy function that accounts for the helical fitting.

9. The method of claim 1 wherein constructing the 3-Dimensional model comprises using an energy function that accounts for a shape from shading modeling technique and the helical fitting.

10. The method of claim 1 further comprising creating a 3-Dimensional physical object based on the 3-Dimensional model at a 3-Dimensional printer.

11. The method of claim 1 further comprising re-lighting the hair portion of the portrait photo based on the 3-Dimensional model.

12. In a computing environment, a method implemented by a computing device for constructing a 3-Dimensional model from a single, two-Dimensional portrait photo, the method comprising:

identifying, by a processor of the computing device, a head portion of a person depicted in a portrait photo, the head portion including a face portion and a hair portion of the person;

identifying, by the processor, a boundary between the face portion and the hair portion of the person depicted in the portrait photo; and constructing, by the processor, a 3-Dimensional model of the head portion of the person depicted in the portrait photo, wherein constructing the 3-Dimensional model comprises:

shape fitting the face portion of the person depicted in the portrait photo to match a 3-Dimensional face shape by matching the face portion with an existing face shape corresponding to an image having known depth information, wherein said matching is based on similarities between the face portion and the existing face shape;

fitting the hair portion to one or more helices by:

clustering pixels of the portrait photo corresponding to the hair portion into multiple super-pixel, wherein pixels of close proximity and aligned orientation below a threshold are added to a super-pixel cluster of the multiple super-pixel clusters; and fitting a helix model of a plurality of helix models corresponding to the one or more helices to each super-pixel cluster of the multiple super-pixel clusters; and including the shape fitted face portion and the fitted hair portion in the 3-Dimensional model of the head portion; and applying positional and normal boundary conditions determined based on one or more relationships between a face portion shape and a hair portion shape; and storing, by the processor, a modified image file including the 3-Dimensional model.

13. The method of claim 12 further comprising receiving user input identifying the boundary between the face portion and the hair portion.

14. The method of claim 12 wherein the positional conditions comprise a condition requiring that the hair portion must attach to a front of the face portion.

15. The method of claim 12 wherein the normal conditions comprise a condition specifying how a normal must be oriented along a silhouette contour.

16. In a computing environment, a method implemented by a computing device constructing a 3-Dimensional model from a single, two-Dimensional portrait photo, the method comprising:

identifying, by a processor of the computing device, a hair portion of a person depicted in a portrait photo;

constructing, by the processor, a 3-Dimensional model of the hair portion of the person depicted in the portrait photo, wherein constructing the 3-Dimensional model of the hair portion comprises fitting the hair portion of the person depicted in the portrait photo to one or more helices by:
  clustering pixels of the portrait photo corresponding to the hair portion into multiple super-pixel, wherein pixels of close proximity and aligned orientation below a threshold are added to a super-pixel cluster of the multiple super-pixel clusters; and
  fitting a helix model of a plurality of helix models corresponding to the one or more helices to each super-pixel cluster of the multiple super-pixel clusters;
using shape from shading to capture fine-scale details in a form of surface normals, the shape from shading based on an adaptive albedo model that allows albedo estimate variation but limits size of albedo estimate variations between neighboring regions of the portrait photo; and
storing, by the processor, a modified image file including the 3-Dimensional model.

17. The method of claim 16, wherein the shape from shading is based on both the adaptive albedo model.

18. The method of claim 16, further comprising constructing a 3-Dimensional model of a face portion of the person depicted in the portrait photo, wherein constructing the 3-Dimension model of the face portion comprises:
  shape fitting the face portion of the person depicted in the portrait photo to match a 3-Dimensional face shape by matching the face portion with an existing face shape corresponding to an image having known depth information, wherein said matching is based on similarities between the face portion and the existing face shape; and
  using an energy function that accounts for the shape fitting and the shape from shading modeling technique.

19. The method of claim 16, further comprising constructing a 3-Dimensional model of a face portion of the person depicted in the portrait photo, wherein constructing the 3-Dimension model of the face portion comprises:
  shape fitting the face portion of the person depicted in the portrait photo to match a 3-Dimensional face shape by matching the face portion with an existing face shape corresponding to an image having known depth information, wherein said matching is based on similarities between the face portion and the existing face shape; and using an energy function that accounts for the shape fitting, the shape from shading modeling technique, and the fitting of the hair portion.

* * * * *